United States Patent [19]

Werkmann et al.

[11] 4,393,724
[45] Jul. 19, 1983

[54] FLOW METER HAVING A ROTARY BODY

[75] Inventors: Karl-Heinz Werkmann; Wolfgang Sauerschell, both of Frankfurt am Main, Fed. Rep. of Germany

[73] Assignee: VDO Adolf Schindling AG, Frankfurt am Main, Fed. Rep. of Germany

[21] Appl. No.: 273,146

[22] Filed: Jun. 12, 1981

[51] Int. Cl.³ .............................................. G01F 1/10
[52] U.S. Cl. ............................. 73/861.91; 73/861.79; 73/861.89; 73/861.92
[58] Field of Search ........... 73/861.79, 861.81, 861.83, 73/861.89, 861.91, 861.92

[56] References Cited

U.S. PATENT DOCUMENTS

| | | | |
|---|---|---|---|
| 3,217,539 | 11/1965 | Owen et al. | 73/861.92 |
| 3,709,037 | 1/1973 | Abbotts | 73/861.92 |
| 3,863,806 | 2/1975 | Risser, Jr. | 73/861.79 |
| 4,316,392 | 2/1982 | Leber | 73/861.83 |

FOREIGN PATENT DOCUMENTS

| | | | |
|---|---|---|---|
| 2906325 | 8/1980 | Fed. Rep. of Germany | 73/861.92 |
| 655154 | 4/1929 | France | 73/861.83 |

Primary Examiner—Howard A. Birmiel
Attorney, Agent, or Firm—Martin A. Farber

[57] ABSTRACT

The present invention relates to a flow meter, particularly for liquids, having an impeller wheel arranged in a vertical tubular measurement bore and acted on by a flow stream. The impeller wheel has a bearing shaft, the ends of which are rotatably mounted in axially and radially guiding bearings respectively. The impeller wheel has one or more vanes, the flow-on attack surfaces of which are inclined to the direction of oncoming flow of the stream. A sensor detects the rotary frequency of the impeller wheel. A movable wall subdivides a chamber into two chamber halves, one of which communicates with an inlet connection and the measurement bore upstream of the impeller and the other one of which communicates with an outlet connection and the measurement bore downstream of the impeller. In order, with such a flow meter, to make possible in simple manner and at low cost of manufacture a high precision of measurement over the entire measurement range, the bearing shaft is arranged with axial play between the bearings and the impeller wheel is acted on from below by the flow. In this connection, the attack surfaces are so inclined with respect to the direction of flow that the force component, directed in the approach direction, of the force exerted by the flow stream on the impeller wheel is equal to or greater than the weight of the impeller wheel.

41 Claims, 9 Drawing Figures

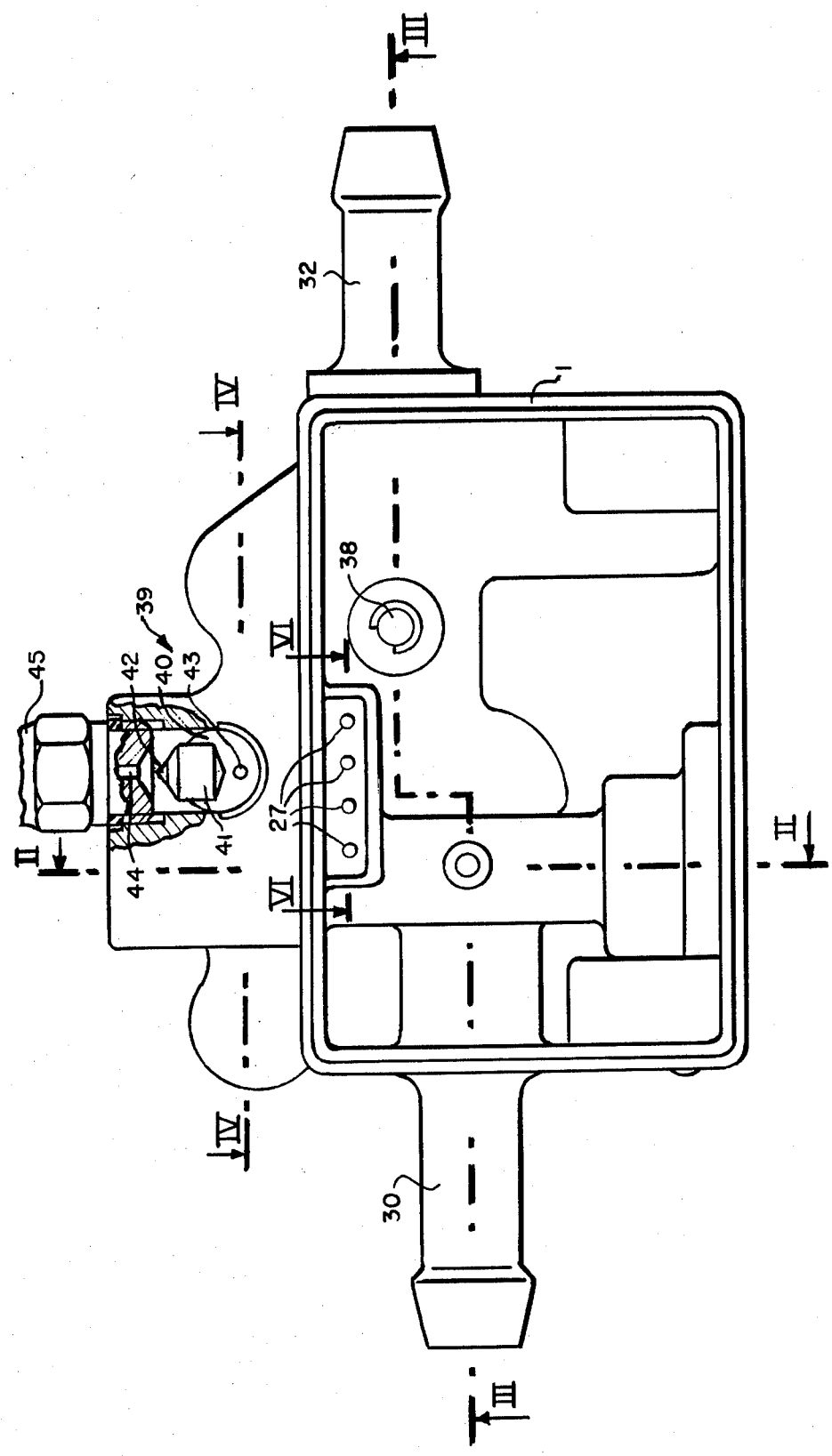
FIG. I.

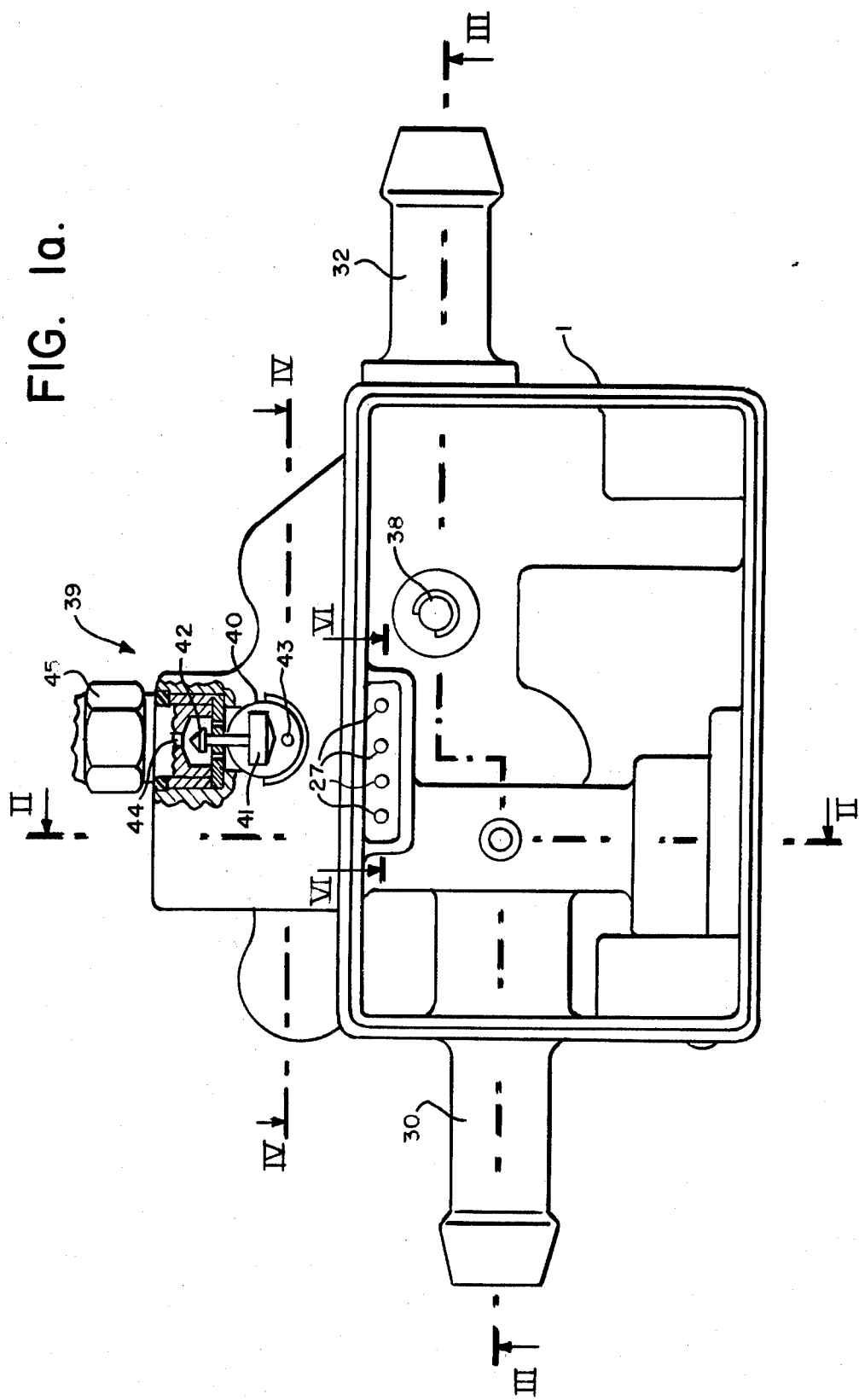

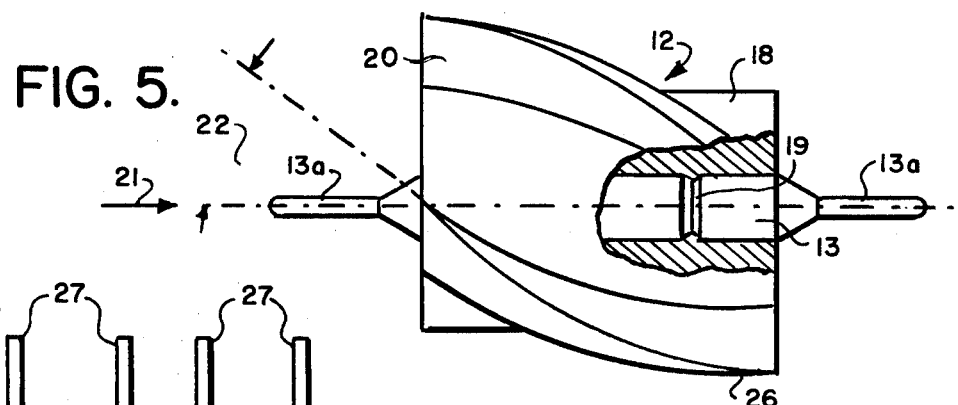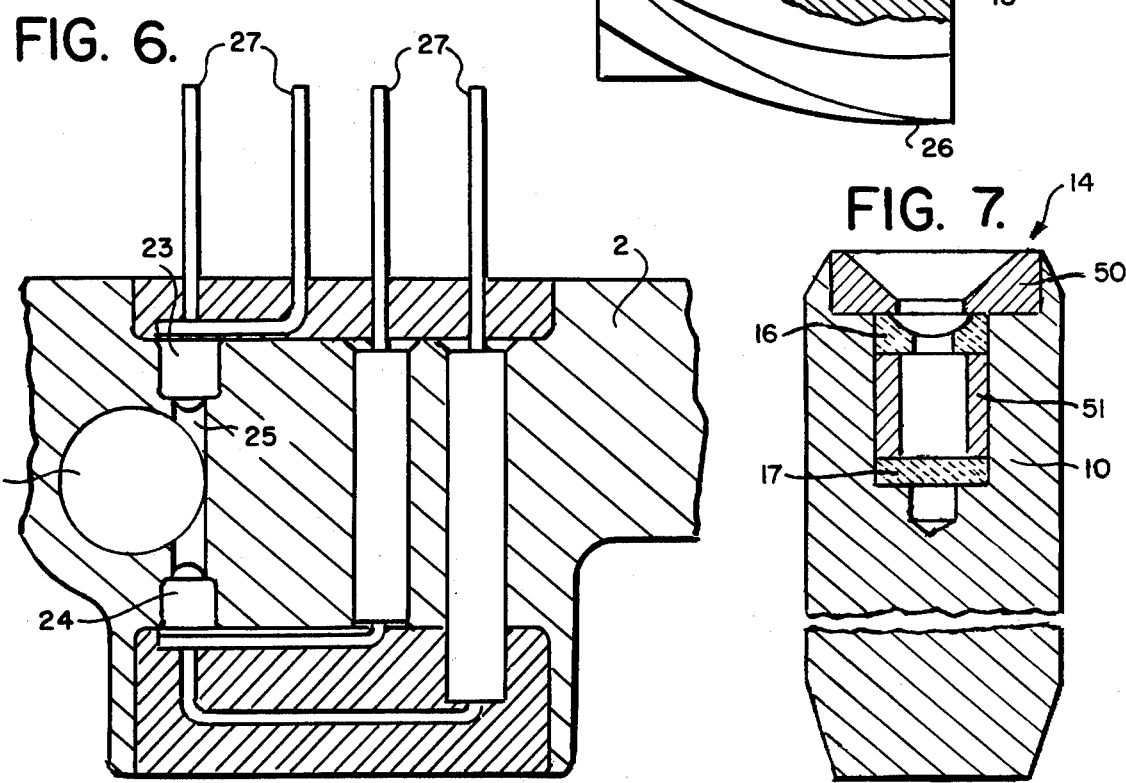

FLOW METER HAVING A ROTARY BODY

BACKGROUND OF THE INVENTION

1. Field of the Invention

The present invention relates to a flow meter, particularly for liquids, having an impeller which is arranged in a vertical line or measurement bore and can be driven by a flow stream, the impeller having a bearing shaft, the ends of which are rotatably mounted in an axially and radially guiding bearing, and one or more vanes of the impeller having their flow-on or attack surfaces inclined to the direction of the oncoming flow, and having a sensor which detects the rotary frequency of the impeller.

2. Description of the Prior Art

In such flow meters it is known to manufacture the impeller of a material whose density corresponds to that of the flowing fluid. In this way the result is obtained that the impeller floats in the flow fluid so that the friction of the mounting shaft in its bearings which must be overcome is kept as small as possible. This is necessary in order to keep measurement inaccuracies due to frictional losses as low as possible, particularly in the range of low velocities of flow.

The development of the impeller with a density equal to that of the flow medium, however, affords great difficulty since, on the one hand, the mounting shaft must consist of metal due to the high resistance to wear which is required while, on the other hand, the selection of the material for the vane part is very limited. This is of great disadvantage in particular when, for instance, a corrosive flow fluid permits the use of only very specific materials for the impeller, for instance metallic materials.

SUMMARY OF THE INVENTION

The object of the invention is, therefore to create a flow meter of the above-indicated type which while simple and cheap to manufacture has a high accuracy of measurement over the entire measurement range.

This object is achieved in accordance with the present invention by a movable wall (e.g. 33, FIGS. 2, 3) subdividing a chamber into two chamber halves (28, 31), one of which communicates with an inlet connection and the measurement bore upstream of the impeller and the other one of which communicates with an outlet connection and the measurement bore downstream of the impeller. This arrangement sees to it that pulsations in the flow fluid which may come, for instance, from a pump are absorbed before reaching the flow meter proper. In this case, the movable wall is preferably a diaphragm (33), since this diaphragm by its deformation contributes to absorption of the pulsations.

If the flow meter is arranged in a vehicle it is of particular advantage if the plane of the movable wall is arranged at an angle of between 45° and 90° to the longitudinal axis of the vehicle. In this way, movements caused in the liquid by accelerations or decelerations of the vehicle are taken up substantially in the chamber which is divided by the movable wall and in this way preventing a reverse flow of flow fluid which cannot be processed by the flow meter. An erroneous reading is thus not produced.

It is further advantageous in accordance with the invention to arrange the bearing shaft (13) with axial play between the bearings (14 and 15) and the impeller is acted on by the flow from below, the flow-on surfaces (20) being inclined to the oncoming direction of flow (21) in such a manner that the component of force in the direction of flow of the force exerted by the flow stream on the impeller is equal to or greater than the weight of the impeller. This development leads to the result that the impeller is lifted from its lower axial bearing point by the fluid flowing through it even upon a flow within the lower measurement range, so that the greatest part of the bearing friction is eliminated. Only in the upper part of the measurement range of the flow meter does the shaft come to rest axially against the upper bearing. Since, however, a high velocity of approach of the fluid and thus a large attack of force on the impeller are present, the axial bearing friction produced thereby can no longer have any substantial influence on the measured values.

Since components of force of different values acting in the direction of flow on the impeller can be obtained by different inclination of the attack surfaces with respect to the direction of approach of the flow, the impeller wheel can be readily made of a material which has a substantially higher density than the flow fluid. By suitable inclination of the attack surfaces even such an impeller can be used without disadvantage. The inclination of the attack surfaces (20) to the direction of approach (21) can be between 45° and 65°, preferably having an inclination of 52°. With these angles of inclination a sufficiently large lifting force acts on the impeller without a negatively large influence on the velocity of flow of the fluid acting.

The impeller can be a turbine wheel (12).

A structurally simple arrangement having only a few structural parts can be obtained by forming the bearings (14 and 15) in the front sides, facing the impeller, of flow straighteners (10 and 11) arranged in the tube line in front of and behind the impeller as seen in the direction of approach.

Since in the flow meter of the invention, axial support of the impeller wheel during operation is necessary only at the rear bearing, as seen in the direction of flow, this bearing is preferably developed as a conical bearing in order to reduce the bearing losses in the upper measurement range of the flow meter. As to the front bearing, as seen in the direction of flow, it is entirely sufficient for it to be developed as a journal bearing.

One simple construction of the flow meter, which can therefore be manufactured economically, consists therein that the tube line is a continuous measurement bore (5) within a housing block (1) into which the impeller and the straighteners (10 and 11) can be axially inserted. A simple mounting of the straighteners and the impeller can be obtained here if the straighteners (10 and 11) can be inserted with forced-fit into the measurement bore (5). The outward directed ends of the measurement bore (5) can be closed in simple fashion by a closure (6 and 7), closure (6) and straightener (10) preferably forming a single one-piece part.

Simple production of the impeller results when the impeller comprises a vaned body (18) placed on the supporting shaft (13), in which connection the vaned body may be a plastic part and the shaft a metal part. For this, in simplest fashion the vaned body can be formed by injection molding on the supporting shaft, so that said body does not require any additional machining.

In order to avoid the vaned body shifting on the supporting shaft as a result of the axial forces acting on it from the flow fluid, the supporting shaft (13) preferably has recesses (19) on the cylindrical outer surface thereof which is surrounded by the vaned body (8). In this way a positive form-locking is produced between vaned body and supporting shaft.

If an inlet bore (8) and an outlet bore (9) are developed in the housing block (1) so as to debouch radially into the measurement bore (5), all of these bores can be produced by simple means by clamping the housing block in a drill and producing the bores.

The inlet bore (8) is connected with one half (28) of the chamber and the outlet bore (9) with the other chamber half (31) of a chamber (28 and 31) subdivided into two chamber halves by a movable wall. This arrangement sees to it that pulsations in the flow fluid which may come, for instance, from a pump are absorbed before reaching the flow meter proper. In this case, the movable wall is preferably a diaphragm (33) since this by its deformation contributes to the absorption of the pulsation.

If the flow meter is arranged in a vehicle it is of particular advantage if the plane of the movable wall is arranged at an angle of between 45° and 90° to the longitudinal axis of the vehicle. In this way, movements caused in the liquid by accelerations or decelerations of the vehicle are taken up substantially in the chamber which is divided by the movable wall and in this way a reverse flow of flow fluid which cannot be processed by the flow meter is prevented. An erroneous reading is thus not produced.

A construction which is easily produced and furthermore readily mounted is obtained if the housing block (1) consists of two housing halves (2 and 3) in each of which housing halves (2 and 3) there is developed, in pot shape, a chamber half (28 and 31), the openings of said chamber halves being directed towards each other, and if the diaphragm (33) has its circumferential edge arranged between the surfaces of the housing halves (2 and 3) which are clamped together. In this way, both the different bores and the chamber halves can be developed by simple means. In this connection, a circumferential packing (34) is preferably arranged between one of the surfaces and the side facing it of the circumferential edge region of the diaphragm (33). This packing (34) can be a sealing ring.

However, it is also possible for the diaphragm (33) to have a liquid-tight impregnation on its edge region located between the surfaces of the housing halves (2 and 3) which are clamped together, the impregnation being preferably fuel-repellent when the flow meter is used as a fuel meter. This impregnation prevents the flow fluid from passing along the fiber fabric of the diaphragm to outside the housing block.

Measurement errors which result from the fact that in the case of a liquid flow fluid, bubbles of gas are contained in said fluid are preferably eliminated by connecting a gas separation valve (39) to the upward directed region of the inlet bore (8) or the chamber half (28) connected to it. Since the gas bubbles move along this upward directed region, they are removed from the stream of liquid at the gas separation valve and do not reach the impeller, so that liquid volumes which are falsified by gas bubbles cannot be measured there.

The gas separation valve (39) is preferably developed as a float valve. In such case, the gas separation valve (39) can have a valve chamber (40) into the lower region of which there discharges an inlet (43) which is in communication with the inlet bore (8) or the chamber half (28) connected with it, and within the upper region of which there debouches an outlet (44) which can be closed by a closure member (42) which can be actuated by a float (41) arranged in the valve chamber (40). The gas bubbles present in the upward directed region of the inlet bore or the chamber half connected with it travel in this connection into the normally liquid-filled valve chamber and collect in the upper region thereof. The float is normally pushed upward by the liquid and in this way presses the closure member into the closed position of the gas separation valve. By the increase in the gas volume, the liquid volume is reduced and thus also the liquid level in the valve chamber. The float also drops in this connection and thus opens the outlet of the gas separation valve so that the gas present in the valve chamber can flow out. Due to the rise in the level of the liquid in the valve chamber which is caused thereby, the float and thus also the closure member are again moved into the closed position and remain there until once again sufficient gas has collected in the valve chamber to effect a new opening process.

The float can be rigidly connected with the closure member. A simple development, while at the same time obtaining dependable closure, is obtained in the manner that the gas separation valve (39) is a seat valve and the mouth of the outlet (44) in the valve chamber (40) is the valve seat. Valve member (42) and/or float (41) can be guided in valve actuation direction, the float being preferably connected in this connection to the valve member by a guide rod which is guided in a guide fixed in the housing.

The outlet can either be connected with the outlet bore and the gas thus returned again to the stream of liquid after the volumetric measurement thereof. However, it is also possible for the outlet (44) to be connected with a return, which can lead, for instance, to a liquid tank.

One simple development comprises forming the valve chamber (40) in pot shape and closing the opening by a closure screw, the outlet (44) being developed in the closure screw. Such a development can be produced without the use of special tools.

In order to determine the rotary frequency of the impeller, a beam is or can be sent preferably by a radiation transmitter along a radiation path to a radiation receiver, the radiation being adapted to be interrupted intermittently by the rotating vanes (26). The number of interruptions of the radiation is then a measure of the volume of flow fluid which has passed through the flow meter. In this connection, the radiation transmitter is preferably a source of light (24) and the radiation receiver a light-sensitive element (23) by which electric signals can be produced. The electric signals can be conducted for processing to an electronic measurement system and be converted into an electrical value.

In order to avoid having increases and decreases in temperature of the flow fluid affect the measurement values of the flow meter, since the volume of the flow fluid varies as a function of the temperature, a temperature sensor can be arranged in one of the channels or chambers of the flow meter, the sensor producing an electrical variable which corresponds to the temperature of the flow fluid and can be fed to the measurement electronic system in order to affect the measurement value. In this way, the measurement value given off by the measurement electronic system relates, in principle, in all cases to a very specific temperature and is thus a generally valid, objective measurement value.

BRIEF DESCRIPTION OF THE DRAWINGS

Preferred embodiments of the invention are shown in the drawing and will be described in further detail with reference to the drawings, in which FIG. 1 is a front view of a flow meter in accordance with the invention partly in section;

FIG. 1a is a view similar to FIG. 1 but showing another embodiment;

FIG. 2 is a section along the line II—II of FIG. 1 or 1a;

FIG. 5 shows the turbine wheel of the flow meter of FIG. 1 or 2 in partial section;

FIG. 6 is a partial section along the line VI—VI of FIG. 1 or 2; and

FIG. 7 is a longitudinal section through a straightener with bearing in accordance with FIG. 1 or 2.

DESCRIPTION OF THE PREFERRED EMBODIMENTS

The flow meter shown in the figures, which is intended for liquids, is to be used in particular as a fuel consumption meter for automotive vehicles.

Figure 2:
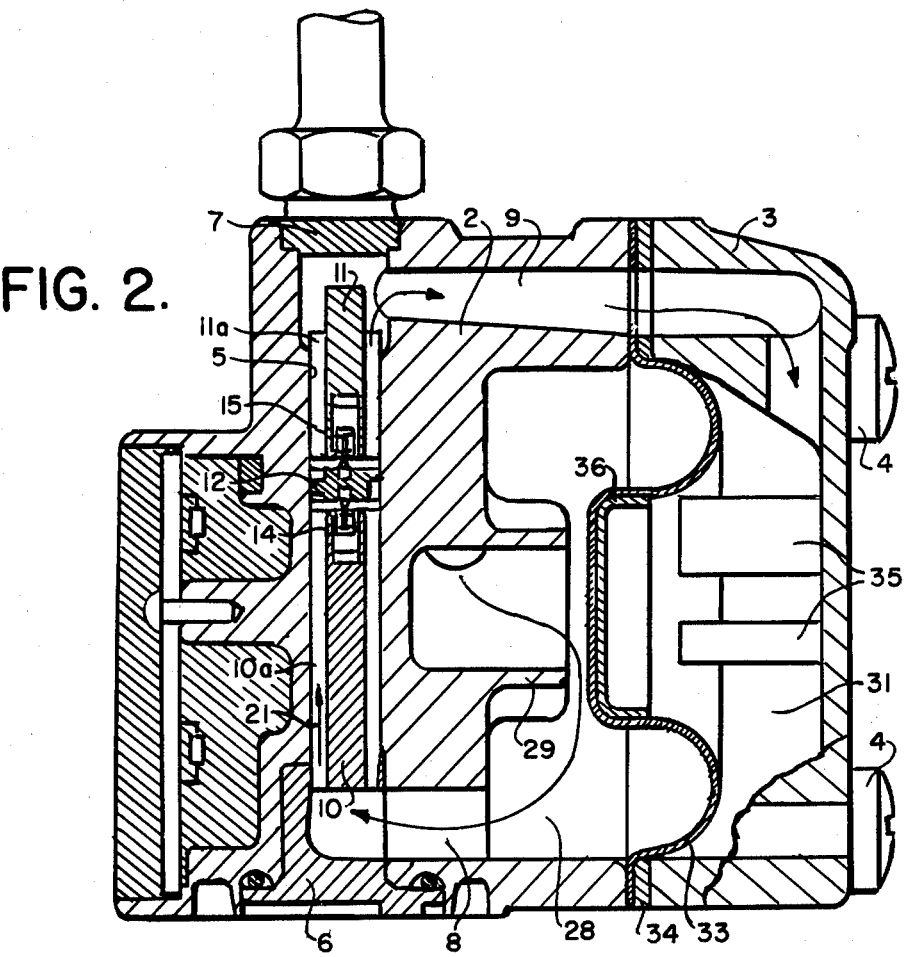

Referring now to FIGS. 1-4, and particularly FIG. 2, the housing block 1 of the flow meter is formed of two housing halves 2 and 3, which are firmly connected to each other by bolts 4. Within the housing half 2, there is developed a continuous measurement bore 5 whose outwardly directed ends are closed by closures 6 and 7.

Into one end region of the measurement bore 5 communicating radially therewith is an inlet bore 8, while the other end region of the measurement bore 5 radially communicates with an outlet bore 9. The measurement bore 5 extends vertically in such a manner that the inlet bore 8 opens within the lower region of the measurement bore 5 and the outlet bore 9 in the upper region.

Within the measurement bore 5 between the inlet bore 8 and the outlet bore 9 two flow rectifiers or flow straighteners 10 and 11 are inserted by forced fit via their blades 10a, 11a, a turbine wheel 12 being arranged between the flow straighteners 10, 11. The turbine wheel 12, which is shown on a larger scale in FIGS. 2a and 5, has a bearing shaft 13, the free ends of which are rotatably supported on axially and radially guiding bearings 14 (also see FIG. 7) and 15 which are disposed in the front sides of the rectifiers 10 and 11 which face the turbine wheel 12.

The flow rectifier 10 is formed as a one-piece structural part with the closure 6 (FIG. 2).

The support of the turbine wheel 12 in the bearings 14 and 15 is of such a nature that the turbine wheel 12 has axial play.

At the bearing 14 one journal pin 13a of the bearing shaft 13 which is made of steel is guided radially in a bearing jewel 16 and limited in its axial movement by a cap jewel 17, the jewels 16, 17 being mounted in the flow straightener 10 by members 50, 51.

At the bearing 15 (FIG. 2a) which is a bottom conical bearing the second journal pin 13a of the bearing shaft 13 is guided radially and limited in its axial movement by a cap jewel 17a which is mounted in the flow straightener 11 by member 50.

The vaned body 18 (FIG. 5) of the turbine wheel 12 is a plastic part which is mounted on the support shaft 13. So that the vaned body 18 cannot shift on the bearing support shaft 13, the latter is provided on its cylindrical surface surrounded by the vaned body 18, with recesses 19 into which the material of the vaned body 18 engages.

The flow-on surfaces 20 of the turbine wheel 12 are inclined by a given angle 22 with resepct to the flow direction 21. This angle 22, which is preferably 52°, is so selected that the force component directed in the flow direction 21 of the force exerted by the flow stream on the turbine wheel 12 is equal to or greater than the weight of the turbine wheel 12. Thus, upon the flow against the turbine wheel 12, the latter is lifted upward from the lower cap jewel 17 of the bearing 14 (FIGS. 2, 2a, 7) and turns freely in floating manner. If the flow-on speed increases, the journal pin 13a of the bearing shaft 13 comes axially against the cap jewel 17a of the upper bearing 15. Due to the fact that with higher velocity of flow a high rotating force also acts on the turbine wheel 12, the frictional forces due to the axial supporting of the shaft 13 at the bearing 15 have practically no influence on the precision of measurement of the flow meter.

The rotary frequency of the turbine wheel 12 and thus the flow stream is determined by a photosensitive element 23 (FIG. 6) which cooperates with a source of light 24. Element 23 and the source of light 24 are arranged opposite each other in a bore 25 which intersects the measurement bore 5 in the region of the turbine wheel 12 which is in the bore 5 (but not drawn in FIG. 6 for clarity) in such a manner that the beam of light directed from the source of light 24 onto the element 23 is interrupted during the rotation of the turbine wheel by the vanes 26 of the latter, but can pass through the spaces between two vanes 26. In this way, the element 23 detects a frequency of light pulses which is proportional to the rotary frequency of the turbine wheel 12, which pulses are transmitted further via connections 27 to a measurement electronic system (not shown).

Figure 3:
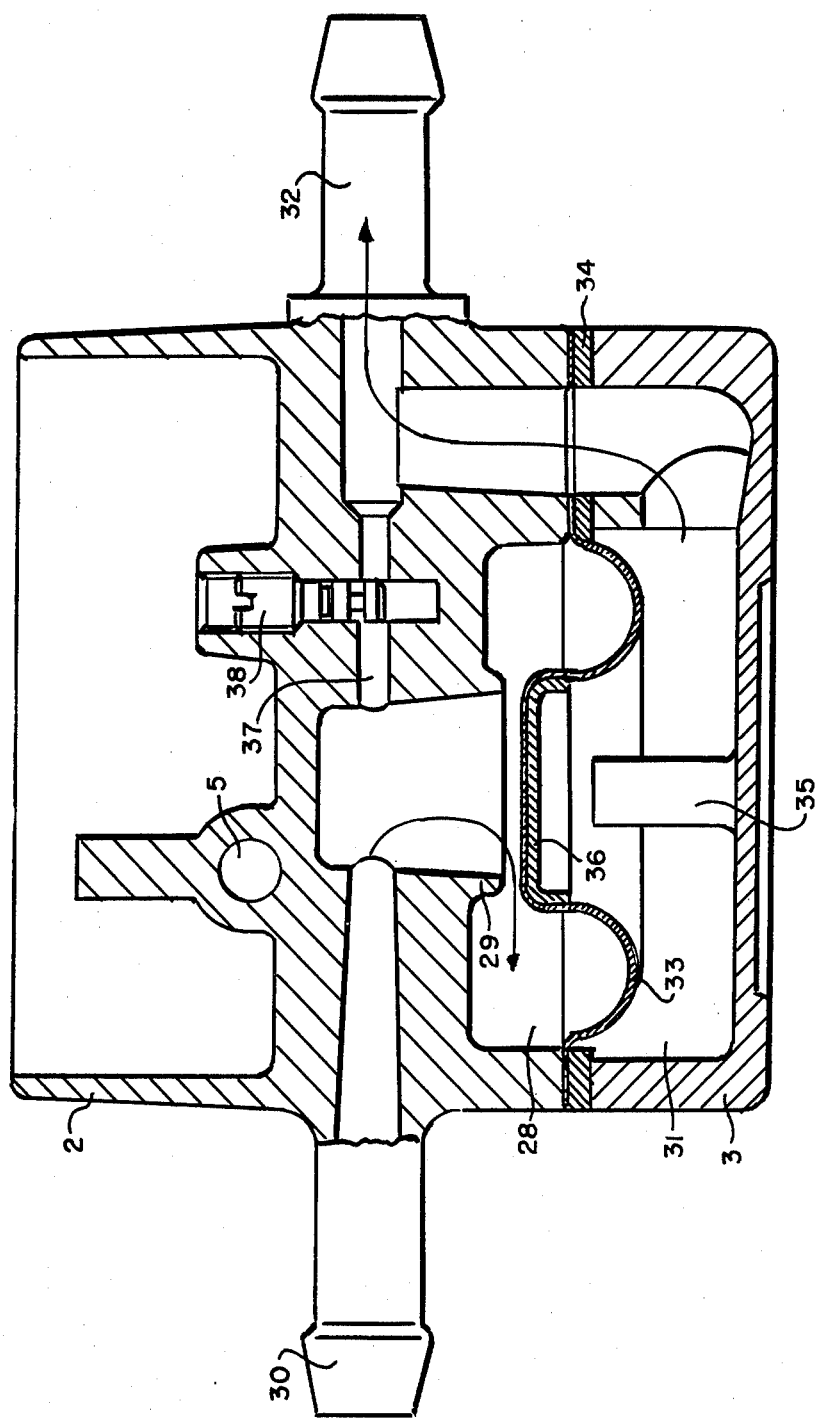
FIG. 3 is a section along the line III—III of FIG. 1 or 2.

The inlet bore 8 (FIG. 2) leads from the measurement bore 5 to a chamber half 28 which is formed in that face wall of the housing half 2 which is directed towards the half 3. Via an inlet connection 29 which debouches centrally into the chamber half 28 (FIG. 4), the chamber half 28 is connected with an inlet connection 30 (FIG. 3).

Corresponding to the chamber half 28 (FIG. 2), there is developed in the front side of the housing part 3 facing the housing part 2 a second chamber half 31 into which the outlet bore 9 debouches and from which a connection leads to an outlet connection 32. Between the surfaces of the housing halves 2 and 3 which are clamped together, there is interposed a membrane 33 which separates the chamber halves 28 and 31 from each other. A seal 34 is inserted for purposes of sealing between the housing half 3 and the diaphragm 33.

The possibility of movement of the diaphragm 33 in the two chamber halves 28 and 31 is limited on the one hand by the inlet connection 29 and on the other hand by stops 35 which are rigidly connected to the housing half 3 and against which the diaphragm 33 comes to rest via a stiffening part 36 which is connected with it.

The flow meter is so installed in an automotive vehicle that the plane of the diaphragm 33 which corresponds to the plane in which the housing halves 2 and 3 rest against each other is arranged at an angle of between 45° and 90° to the longitudinal axis of the vehicle. As can be noted from FIG. 3, a connection 37 extends from the inlet connection 29 directly to the outlet connection 32. The cross section of passage of this connection 37 can be closed off to a greater or lesser extent by a shut-off screw 38. By means of this shut-off screw 38, calibration of the flow meter can be effected after it has been installed. Calibration is necessary in order, for instance, to compensate for measurement errors caused by machining tolerances of the individual parts.

Figure 4:
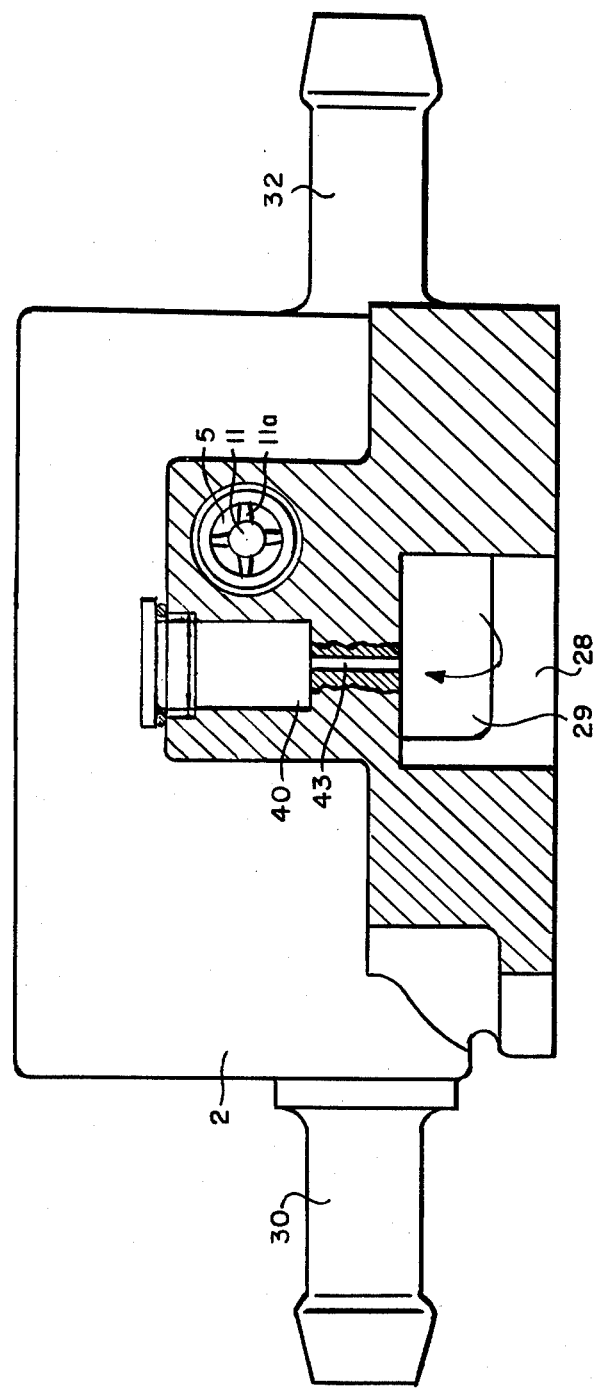
FIG. 4 is a section along the line IV—IV of FIG. 1 or 2.

FIG. 4 is a horizontal cross-sectional view through a valve chamber 40. A vertical sectional view of a valve chamber 40 of the gas separation valve 39 is shown in FIG. 1 and FIG. 1a. The valve chamber 40 is closed by closure screw. The closure screw is formed as a connection in which an outlet 44 is formed. The upper region of the chamber half 28 is connected via an inlet 43 with the valve chamber 40 in which a float 41 is arranged. The float 41 carries at its upper end a closure member 42 by which the outlet 44 which debouches in the upper region of the valve chamber 40 can be closed. The mouth of the outlet 44 in the valve chamber 40 forms a valve seat.

The outlet 44 leads to a connection 45 which is connected with a return (not shown) which leads to a fuel tank of the vehicle.

Due to the fact that the inlet 43 debouches in the upper region of the chamber half 28, bubbles of gas present in the liquid pass through the inlet 43 into the valve chamber 40 and collect in the upper region of the latter. Since the valve chamber 40 is normally filled with liquid, the float 41 is in its upper position so that the closure member 42 closes off the outlet 44. If the amount of gas which has accumulated is so great and the level of liquid in the valve chamber has dropped so far that the float 41 descends, the outlet 44 is opened and the gas can flow out. The increase in the level of liquid produced thereby in the valve chamber 40 now lifts the float 41 so that the outlet 44 is again shut off. Due to the fact that the gas bubbles are removed from the liquid in front of the measurement bore 5 they cannot affect the measurement at the turbine wheel 12 or lead to measurement errors.

We claim:

1. In a flow meter, particularly for liquids, having an impeller which is arranged in a measurement bore and is drivable by a flow stream of oncoming flow flowing through the measurement bore, the improvement comprising
   a housing forming a chamber with an inlet connection and an outlet connection,
   a movable wall subdividing said chamber into two chamber halves,
   one of said chamber halves is in communication with said inlet connection and the measurement bore upstream of said impeller,
   the other of said chamber halves is in communication with said outlet connection and the measurement bore downstream of said impeller,
   the impeller has a bearing shaft, the ends of said bearing shaft being rotatably mounted in an axially and radially guiding bearing,
   at least one vane of the impeller having a flow-on surface inclined to the direction of the oncoming flow, and
   sensor means for detecting the rotary frequency of said impeller.

2. The flow meter as set forth in claim 1, wherein the flow-on attack surfaces have an inclination to the direction of the flow between 45 degrees and 65 degrees.

3. The flow meter as set forth in claim 2, wherein said inclination is 52 degrees.

4. The flow meter as set forth in claim 1, wherein said impeller is a turbine wheel.

5. The flow meter as set forth in claim 1, further comprising
   flow straighteners arranged in said line in front of and behind the impeller as seen in the direction of the flow, and
   said bearings are arranged in front sides of said flow straighteners facing said impeller.

6. The flow meter as set forth in claim 5, further comprising
   a housing block,
   said line is a continuous measurement bore formed within said housing block, said impeller and said straighteners are axially inserted in said bore.

7. The flow meter as set forth in claim 6, wherein said straighteners are mounted in a forced-fit into said measurement bore.

8. The flow meter as set forth in claim 1, wherein an upstream rear of said bearings is a conical bearing.

9. The flow meter as set forth in claim 1, wherein a downstream front of said bearings is a journal bearing.

10. The flow meter as set forth in claim 1, wherein the impeller comprises a vaned body mounted on the bearing shaft.

11. The flow meter as set forth in claim 10, wherein said vaned body is a plastic part and said bearing shaft is a metal part.

12. The flow meter as set forth in claim 11, wherein said vaned body is a part injection molded to said bearing shaft.

13. The flow meter as set forth in claim 11, wherein said bearing shaft has a cylindrical outer surface surrounded by said vaned body, said cylindrical outer surface is formed with recesses in which said vaned body engages.

14. The flow meter as set forth in claim 1, wherein said sensor means comprises
    means comprising a radiation transmitter for sending radiation along a radiation path intersecting said at least one vane of said impeller,
    a radiation receiver means for receiving said radiation beyond said impeller, the radiation being adapted to be interrupted intermittently by rotation of the at least one vane.

15. The flow meter as set forth in claim 14, wherein said radiation transmitter is a source of light and said radiation receiver means is a light-sensitive element constituting means for producing electric signals.

16. The flow meter as set forth in claim 15, further comprising
    an electronic measurement means for receiving said electric signals and converting said electric signals into an electric value, the latter constituting a flow measurement value.

17. The flow meter as set forth in claim 16, further comprising
    members comprising channels and chambers operatively communicating with the impeller in which the flow passes,
    a temperature sensor is arranged in one of said members and constitutes means for producing an electrical variable which corresponds to the temperature of the flow stream and for feeding said electric variable to said measurement means in order to affect the measurement value.

18. The flow meter as set forth in claim 1, wherein the shaft is disposed with axial play between said bearings, the impeller is arranged in said measurement bore such that it is acted on by the flow stream from below, and the flow-on surface of the impeller is inclined relative to the direction of the oncoming flow in such a manner that the force component in the direction of the flow of the force exerted by the flow stream on the impeller is at least equal to the weight of the impeller.

19. The flow meter as set forth in claim 1, wherein said movable wall is a diaphragm.

20. The flow meter as set forth in claim 19 mounted in a vehicle, wherein said movable wall defines a plane disposed at an angle of between 45 degrees and 90 degrees to the longitudinal axis of the vehicle.

21. In a flow meter, particularly for liquids, having an impeller which is arranged in a vertical line and can be driven by a flow stream flowing through the line, the impeller having a bearing shaft the ends of which are rotatably mounted in an axially and radially guiding bearing, at least one vane of the impeller having a flow-on surface inclined to the direction of the oncoming flow, and a sensor which detects the rotary frequency of the impeller, the improvement wherein the shaft is disposed with axial play between said bearings, the impeller is arranged in the line such that it is acted on by the flow stream from below, the flow-on surface of the impeller is inclined relative to the direction of the oncoming flow in such a manner that the force component in the direction of the flow of the force exerted by the flow stream on the impeller is at least equal to the weight of the impeller, flow straighteners arranged in said line in front of and behind the impeller as seen in the direction of the flow, said bearings are arranged in front sides of said flow straighteners facing said impeller, a housing block, said line is a continuous measurement bore formed within and completely through said housing block, said impeller and said straighteners being axially inserted in said bore, and means comprising closures for closing outer ends of said measurement bore, respectively.

22. The flow meter as set forth in claim 21, wherein an upstream one of said closures and an adjacent of said straighteners form a single one-piece component.

23. In a flow meter, particularly for liquids, having an impeller which is arranged in a vertical line and can be driven by a flow stream flowing through the line, the impeller having a bearing shaft the ends of which are rotatably mounted in an axially and radially guiding bearing, at least one vane of the impeller having a flow-on surface inclined to the direction of the oncoming flow, and a sensor which detects the rotary frequency of the impeller, the improvement wherein the shaft is disposed with axial play between said bearings, the impeller is arranged in the line such that it is acted on by the flow stream from below, the flow-on surface of the impeller is inclined relative to the direction of the oncoming flow in such a manner that the force component in the direction of the flow of the force exerted by the flow stream on the impeller is at least equal to the weight of the impeller, flow straighteners arranged in said line in front of and behind the impeller as seen in the direction of the flow, said bearings are arranged in front sides of said flow straighteners facing said impeller, a housing block, said line is a continuous measurement bore formed within said housing block, said impeller and said straighteners are axially inserted in said bore, and said housing block is formed with an inlet bore and an outlet bore communicating with said measurement bore in a radial direction relative thereto.

24. The flow meter as set forth in claim 23, wherein said housing block is formed with a chamber, a movable wall is mounted in said housing block and subdivides said chamber into two chamber halves communicating respectively with said inlet bore and said outlet bore.

25. The flow meter as set forth in claim 24, wherein said movable wall is a diaphragm.

26. The flow meter as set forth in claim 25 mounted in a vehicle, wherein said movable wall defines a plane disposed at an angle of between 45 degrees and 90 degrees to the longitudinal axis of the vehicle.

27. In a flow meter, particularly for liquids, having an impeller which is arranged in a vertical line and can be driven by a flow stream flowing through the line, the impeller having a bearing shaft the ends of which are rotatably mounted in an axially and radially guiding bearing, at least one vane of the impeller having a flow-on surface inclined to the direction of the oncoming flow, and a sensor which detects the rotary frequency of the impeller, the improvement wherein the shaft is disposed with axial play between said bearings, the impeller is arranged in the line such that it is acted on by the flow stream from below, the flow-on surface of the impeller is inclined relative to the direction of the oncoming flow in such a manner that the force component in the direction of the flow of the force exerted by the flow stream on the impeller is at least equal to the weight of the impeller, flow straighteners arranged in said line in front of and behind the impeller as seen in the direction of the flow, said bearings are arranged in front sides of said flow straighteners facing said impeller, a housing block, said line is a continuous measurement bore formed within said housing block, said impeller and said straighteners are axially inserted in said bore, said housing block comprises two housing halves, each of said housing halves forms a chamber half having the shape of a pot, defining an opening, said openings of said chamber halves are directed towards each other, a diaphragm has a circumferential edge arranged between surfaces of said housing halves adjacent said openings, means for clamping together said surfaces of said housing halves with said diaphragm therebetween, and said chamber halves communicate with said measurement bore upstream and downstream of said impeller, respectively.

28. The flow meter as set forth in claim 27, further comprising a circumferential packing is arranged between one of said surfaces of said housing halves and a side of a circumferential edge region of said diaphragm facing one of said surfaces of said housing halves.

29. The flow meter as set forth in claim 28, wherein said packing is a sealing ring.

30. The flow meter as set forth in claim 29, wherein said impregnation is fuel-repellent.

31. The flow meter as set forth in claim 28, wherein said diaphragm has a liquid-tight impregnation on said edge region of said diaphragm located between said surfaces of said housing halves which are clamped together.

32. In a flow meter, particularly for liquids, having an impeller which is arranged in a vertical line and can be driven by a flow stream flowing through the line, the impeller having a bearing shaft the ends of which are rotatably mounted in an axially and radially guiding bearing, at least one vane of the impeller having a flow-on surface inclined to the direction of the oncoming flow, and a sensor which detects the rotary frequency of the impeller, the improvement wherein the shaft is disposed with axial play between said bearings, the impeller is arranged in the line such that it is acted on by the flow stream from below, the flow-on surface of the impeller is inclined relative to the direction of the oncoming flow in such a manner that the force component in the direction of the flow of the force exerted by the flow stream on the impeller is at least equal to the weight of the impeller, an inlet chamber half, an inlet bore communicating with said inlet chamber half and said line, and a gas separation valve is connected to an upwardly directed region of said inlet bore or of said said inlet chamber half.

33. The flow meter as set forth in claim 32, wherein said gas separation valve includes a float valve.

34. The flow meter as set forth in claim 33, wherein said float valve includes a float and a closure member rigidly connected together.

35. The flow meter as set forth in claim 33, wherein said float valve includes, a valve chamber having a lower region, an inlet is in communication with said lower region of said valve chamber and with said inlet bore or said inlet chamber half, said valve chamber has an upper region defining an outlet, a closure means for closing said outlet, and a float arranged in said valve chamber and actuatingly connected to said closure means.

36. The flow meter as set forth in claim 35, wherein said gas separation valve is a seat valve and a mouth of said outlet in said valve chamber constitutes a valve seat, said seat valve is coordinated to said valve seat.

37. The flow meter as set forth in claim 35, wherein said closure means and/or said float is guided in a direction of actuation of the valve.

38. The flow meter as set forth in claim 37, further comprising a guide rod connects said float to said closure means, said guide rod is guided in a guide fixed in a housing.

39. The flow meter as set forth in claim 35, wherein said outlet is connected with an outlet bore.

40. The flow meter as set forth in claim 35, wherein said outlet is connected with a flow return line.

41. The flow meter as set forth in claim 35, wherein said valve chamber has a pot shape, a closure screw is screwed into said valve chamber, said outlet is formed in said closure screw.

* * * * *

UNITED STATES PATENT AND TRADEMARK OFFICE
CERTIFICATE OF CORRECTION

PATENT NO. : 4,393,724

DATED : July 19, 1983

INVENTOR(S) : Karl-Heinz Werkmann, et al

Figure 2A:
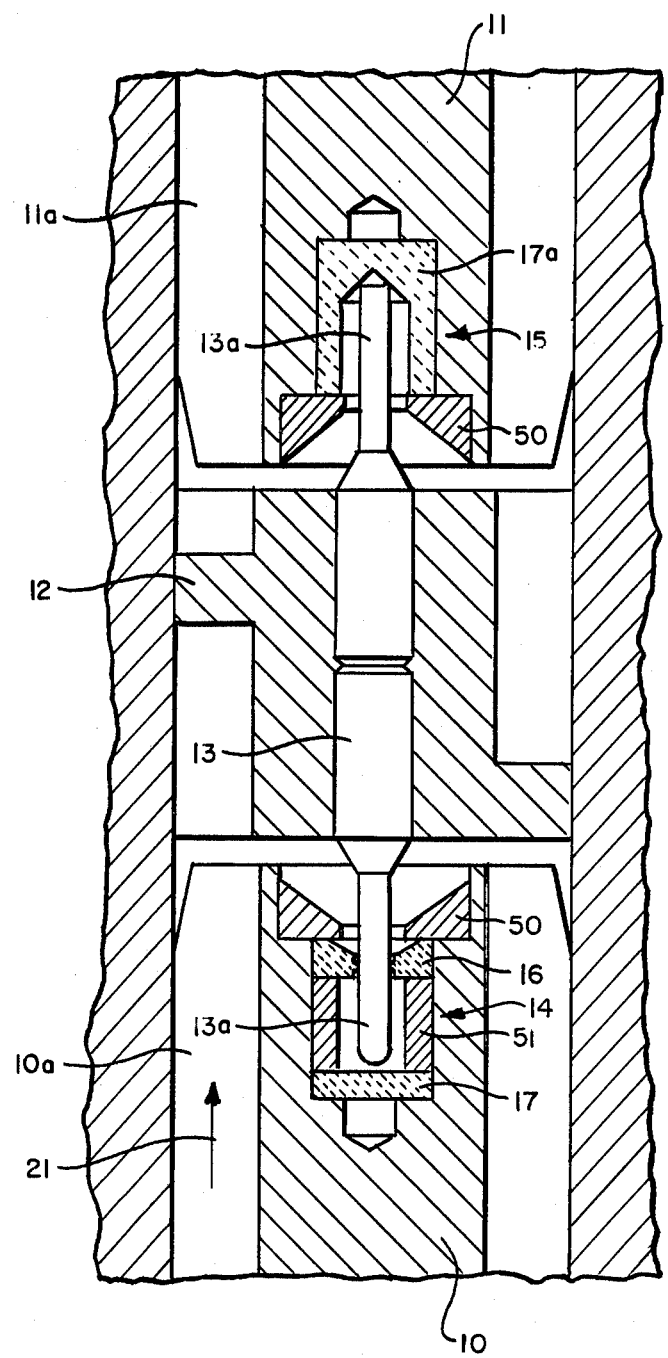

It is certified that error appears in the above-identified patent and that said Letters Patent are hereby corrected as shown below:

Column 7, Line 66 (Claim 2) delete "attack"
In the specification:
Column 5, Line 9, after "embodiment" insert the following new line --Fig. 2a is an enlarged section of a portion of Fig. 2;--
Line 10 "FIG." (2nd occurrence) should read --FIGS.--
Line 12 "FIG." (2nd occurrence) should read --FIGS.--
Lines 13, 15, 17, 19, 21 "2" (all occurrences) should read --1a--
Line 14 "FIG." (2nd occurrence) should read --FIGS.--
Line 17 "FIG." should read --FIGS.--
Line 19 "FIG." should read --FIGS.--
Line 21 "FIG." should read --FIGS.--
Column 7, Line 9 "a" should read --the--

Signed and Sealed this

Fifteenth Day of November 1983

[SEAL]

Attest:

GERALD J. MOSSINGHOFF

*Attesting Officer*  *Commissioner of Patents and Trademarks*